United States Patent
Yang et al.

(10) Patent No.: US 6,982,403 B2
(45) Date of Patent: Jan. 3, 2006

(54) METHOD AND APPARATUS KTC NOISE CANCELLING IN A LINEAR CMOS IMAGE SENSOR

(75) Inventors: Hongli Yang, Cupertino, CA (US); Xinping He, San Jose, CA (US); Qingwei Shan, San Jose, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 574 days.

(21) Appl. No.: 10/109,390

(22) Filed: Mar. 27, 2002

(65) Prior Publication Data

US 2003/0183745 A1    Oct. 2, 2003

(51) Int. Cl.
*H01L 27/00* (2006.01)
(52) U.S. Cl. .............................. 250/208.1; 250/214 R; 348/308
(58) Field of Classification Search ............ 250/214 C, 250/214 R, 208.1; 348/308, 311, 241, 297; 327/514, 515
See application file for complete search history.

(56) References Cited

U.S. PATENT DOCUMENTS

| | | | | |
|---|---|---|---|---|
| 5,471,515 A | * | 11/1995 | Fossum et al. | 377/60 |
| 5,962,844 A | * | 10/1999 | Merrill et al. | 250/214 A |
| 6,021,172 A | * | 2/2000 | Fossum et al. | 377/60 |
| 6,078,037 A | * | 6/2000 | Booth, Jr. | 250/208.1 |
| 6,133,862 A | * | 10/2000 | Dhuse et al. | 341/118 |
| 6,141,050 A | * | 10/2000 | Ackland et al. | 348/308 |
| 6,243,134 B1 | * | 6/2001 | Beiley | 348/308 |
| 6,344,877 B1 | * | 2/2002 | Gowda et al. | 348/245 |
| 2003/0133030 A1 | * | 7/2003 | Borg | 348/308 |

* cited by examiner

*Primary Examiner*—David Porta
*Assistant Examiner*—Stephen Yam
(74) *Attorney, Agent, or Firm*—Perkins Coie LLP

(57) ABSTRACT

A method of reading out a pixel signal from a pixel is disclosed. The method comprises first capturing a first black reference signal from the pixel prior to the pixel starting an integration period. Next, after completion of the integration period, a pixel signal is captured. Next, a second black reference signal is captured following completion of the integration period. Finally, the first black reference signal, second black reference signal, and pixel signal is output.

10 Claims, 3 Drawing Sheets

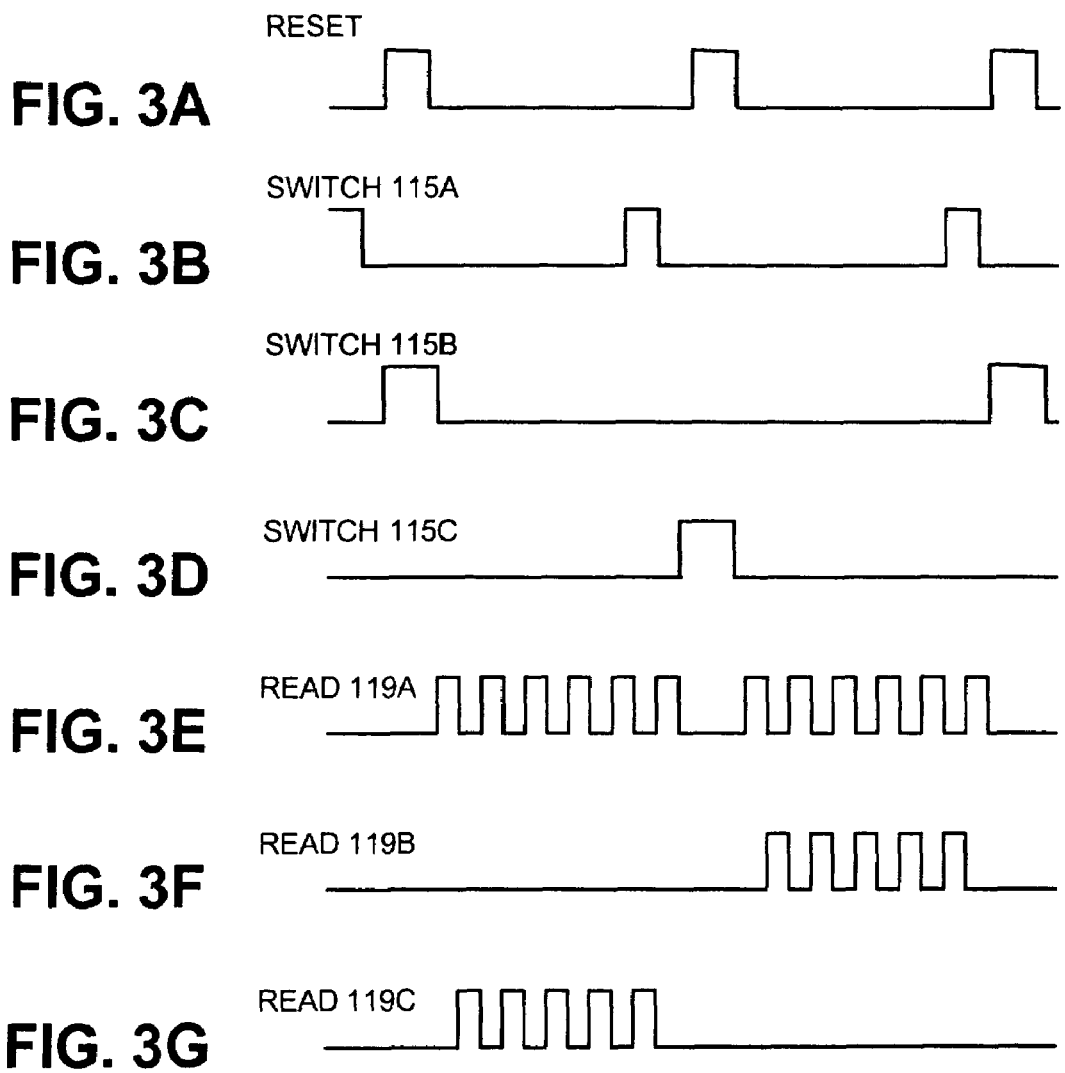

METHOD AND APPARATUS KTC NOISE CANCELLING IN A LINEAR CMOS IMAGE SENSOR

TECHNICAL FIELD OF THE INVENTION

The present invention relates generally to CMOS image sensors, and more particularly, to a method and circuit for canceling kTC noise in a linear image sensor.

BACKGROUND OF THE INVENTION

Integrated circuit technology has revolutionized various fields including computers, control systems, telecommunications, and imaging. For example, in the imaging field, CMOS image sensors have proved to be less expensive to manufacture relative to CCD imaging devices. Further, for certain applications CMOS devices are superior in performance. For example, the signal processing logic necessary can be integrated alongside the imaging circuitry, thus allowing for a single integrated chip to form a complete stand alone imaging device.

Despite the advances of CMOS image sensor technology, certain remaining problems prevent their widespread acceptance. One such problem is "kTC" noise introduced in CMOS pixels during a reset operation. Specifically, in CMOS arrays, each pixel must be reset before the pixel starts its "integration" period. Generally, this reset step requires that each pixel have an associated transistor switched on to allow a reset voltage to reach the photodiode of the associated pixel. When the associated transistor is turned off, the voltage of the photodiode should be equal to the reset voltage. However, thermal noise (referred to as kTC noise) in the transistor channel introduces some variability in the quantity of charge injected in each pixel after each reset. Because thermal noise is truly random, voltage variations on individual pixels occurring once will not necessarily occur with the same variation a second time. The magnitude of kTC noise is related to k, the Boltzmann constant, T, the temperature in Kelvin, and C, the capacitance in the current path. The local temperature variations in each pixel give rise to this random kTC noise.

Prior art attempts to combat kTC noise focused on varying the structure of the pixel. For example, pixels using four transistors have been proposed. However, this has the disadvantage of large pixel size and difficulty to manufacture. Similarly, in U.S. Pat. No. 5,981,932 describes a pixel that performs kTC noise canceling by storing charge in a pseudo-capacitor. However, this pixel requires additional process steps to manufacture, as well as additional timing requirements to operate. Further, the pixel of the '932 patent requires an additional transistor to provide additional switching to ground or power.

Thus, it is desirable to provide a simple and easy to manufacture method or apparatus that can compensate for kTC noise.

BRIEF DESCRIPTION OF THE DRAWINGS

In the drawings, like reference numerals refer to like parts throughout the various views of the non-limiting and non-exhaustive embodiments of the present invention, and wherein:

FIGS. 3A–3G are timing diagram that illustrate the operation of the column readout circuit of FIG. 2.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
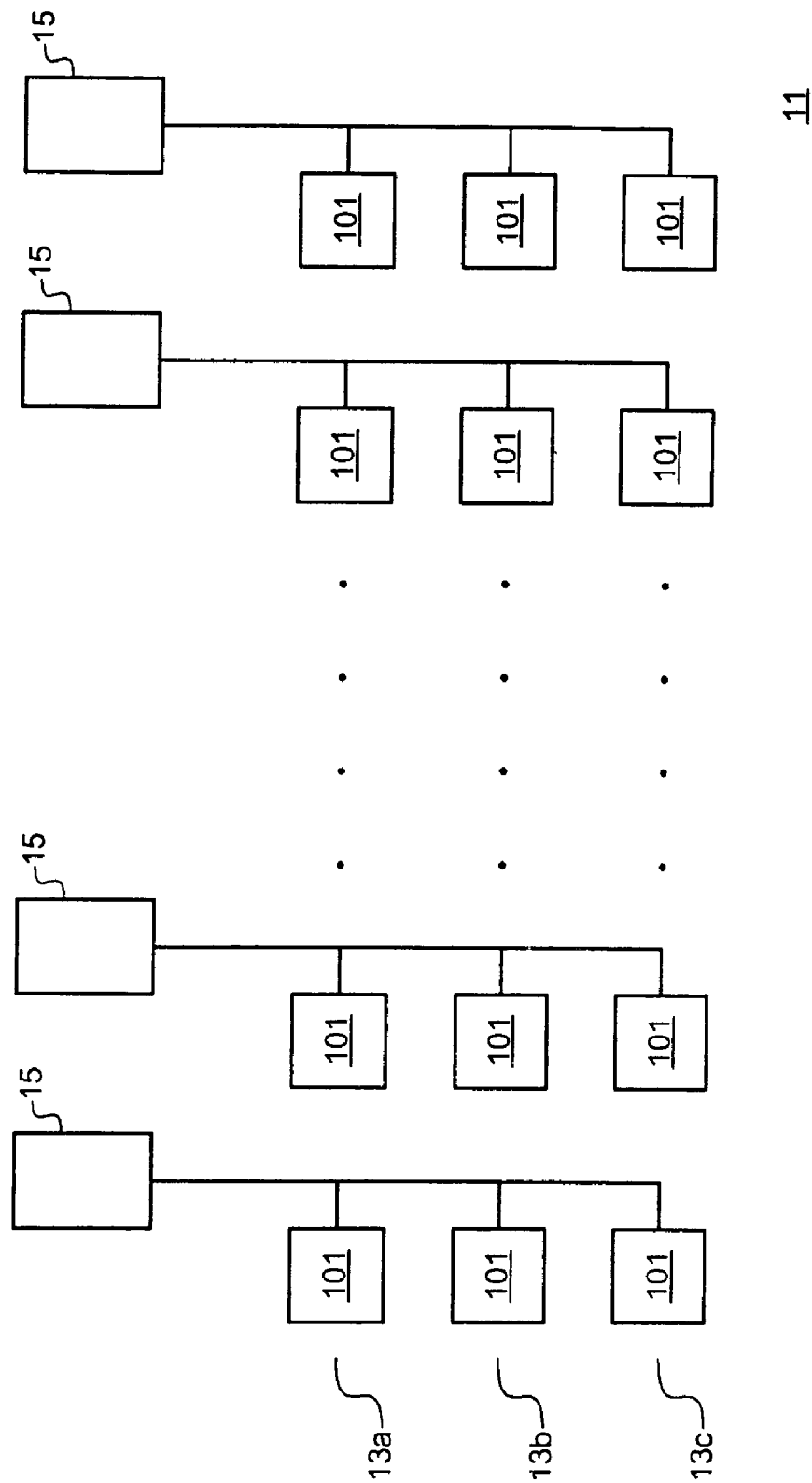
FIG. 1 is a schematic diagram of a linear CMOS image sensor formed in accordance with the present invention.

While the present invention can be applied to CMOS image sensors generally, the present invention will be described in conjunction with a "linear sensor" typically used with scanners. In many respects, as seen in FIG. 1, the linear sensor 11 is simply a smaller version of an image sensor. For example, a conventional image sensor has an array of pixels 101 having a size corresponding to one of several known standards, such as CIF format, VGA format, or SVGA format. However, a linear sensor 11 typically has only one row (for black and white) or three rows 13a, 13b, and 13c (for color) of pixels. Thus, a color linear sensor may have three rows of pixels, each row having perhaps 1000 pixels.

As noted above, a CMOS image sensor includes an array of pixels formed into columns and rows. Typically, each column of pixels has associated therewith a column readout circuit 15, which is the subject of the present invention. In the description below, a single pixel is described in connection with a readout circuit. It can be appreciated that multiple readout circuits would be required for the full image sensor.

Figure 2:
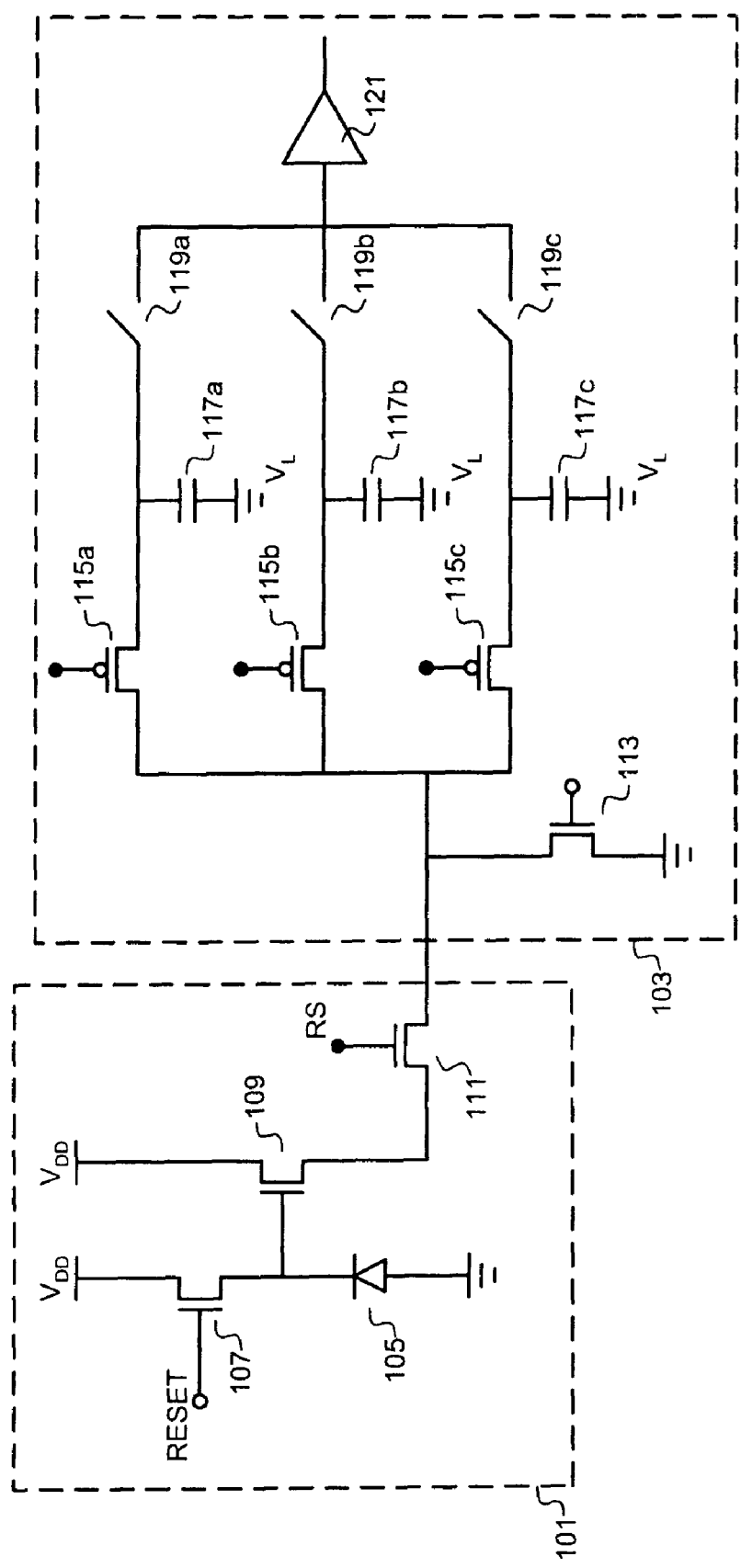
FIG. 2 is a schematic diagram of a pixel and an associated column readout circuit formed in accordance with the present invention.

Turning to FIG. 2, an active pixel 101 is shown connected to a readout circuit 103. The active pixel 101 includes a photodiode 105, a reset transistor 107, pixel output transistor 109, and row select transistor 111. The configuration of the active pixel 101 is conventional in the prior art. In operation, the photodiode 105 provides a light signal output that is indicative of the amount of light impinging on the photodiode 105. The light signal is used to modulate the pixel output transistor 109 in order to output a photo signal if the row select (RS) transistor 111 is turned on. The pixel output transistor 109 is also referred to as being in source follower configuration. The reset transistor 107 is used to reset the pixel 101 for the next signal integration period.

The readout circuit 103 includes three branches: a first branch for capturing the photo signal, a second branch for capturing a first black reference, and a third branch for capturing a second black reference. Specifically, the source of the pixel output transistor is connected, through row select transistor 111, to the first, second, and third branches. The use of the three branches allows for correlated double sampling, a technique useful for minimizing 1/f noise and fixed pattern noise. Note that for correlated double sampling, typically a shorting transistor is used between the two branches. However, for clarity purposes, the shorting transistor is omitted from the readout circuit shown in FIG. 2.

The first, second, and third branches are essentially structured the same. For ease of understanding, like elements are designated with like numerals, except that the first branch for capturing the photo signal is designated with an "a", the second branch for capturing the first black reference signal is designated with a "b", and the third branch for capturing the second black reference signal is designated with a "c".

The readout circuit 103 includes a load transistor 113 of the pixel output transistor 109. The first, second, and third branches each include branch select transistors 115a, 115b, and 115c. These act as switches to select the branch to which the signal output by the active pixel 101 is directed. Note that in this embodiment, the select transistors 115a–115c are PMOS transistors; however, it can be appreciated that NMOS transistors may also be used.

Downstream of the branch select transistors 115a–115c are capacitors 117a, 117b, and 117c. The term downstream refers to locations in the signal path subsequent to a reference location. The capacitors 117a–117c have a first plate connected to a voltage $V_L$, which may be $V_{SS}$ or ground. The second plate of the capacitor is connected to the drain of the select transistors 115a–115c. The capacitors 117a–117c may be poly-poly capacitors, metal-metal capacitors, MOS capacitors, or any type of conventional capacitor formed in a semiconductor process.

Additionally, the second plate of the capacitors are connected to read switches 119a–119c. These read switches 119a–119c selectively open and close to read out the various signals on the capacitors 117a–117c through a buffer 121. These signals are then subsequently processed to extract the signal from the pixel 101. Unlike the prior art, both a first black reference and a second black reference are used to correlate the signal from the pixel.

Specifically, turning to FIGS. 3A–3G, when the pixel 101 is undergoing a reset operation (by turning on reset transistor 107 and seen in FIG. 3A), only the second branch select transistor 115b is turned on as seen in FIG. 3C. This captures a first black reference signal onto the capacitor 117b. Note that the first black reference signal is taken prior to integration of the pixel signal. Both the first and third branch select transistors 115a and 115c are off as seen in FIGS. 3B and 3D.

After the first black reference signal is captured on capacitor 117b, as seen in FIG. 3E, the read switch 119a for the pixel signal branch is turned on to read out the pixel signal through buffer 121. Note that the capacitor 117a stores the pixel signal from the previous cycle. Subsequently, as seen in FIG. 3G, the read switch 119c for the second black reference signal branch is turned on to read out the second black reference signal through buffer 121. Note that the second black reference signal was stored in a previous cycle and was the "first" black reference signal in the previous cycle. Similarly, note also that the second black reference signal for a particular pixel 101 will serve as the first black reference signal for a next pixel (in a subsequent row) to be sampled.

Continuing, the select transistor 115a is then turned on as seen in FIG. 3B. This causes a new pixel signal to be stored onto the capacitor 117a. Thus, the cycle is complete and the next readout cycle can begin. This occurs when the reset transistor is again activated as seen in FIG. 3A and the second black reference signal is stored onto capacitor 117c by activating select transistor 115c as seen in FIG. 3D.

The operation of the circuit is such that a first black reference signal is captured before pixel signal integration and a second black reference signal is captured after pixel signal integration. All of these signals are passed through buffer 121 for subsequent signal processing. In particular, the first black reference signal and the second black reference signal may be used in connection with correlated double sampling techniques to cancel the kTC noise.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. For example, the above detailed description has been given in terms of adjusting the exposure time. However, the techniques described above apply equally to gain control. For example, instead of increasing or decreasing the amount of exposure, the amount of gain can be similarly increased or decreased. Still further, both the exposure time and gain can be increased or decreased as the need may be. Thus, the scope of the invention is indicated by the appended claims rather than by the foregoing description, and all changes which come within the meaning and range of equivalency of the claims are intended to be embraced therein.

What is claimed is:

1. A method of reading out a pixel signal from a pixel comprising:
    capturing a first black reference signal from said pixel prior to said pixel starting an integration period;
    after completion of said integration period, capturing a pixel signal;
    capturing a second black reference signal following completion of said integration period; and
    outputting said first black reference signal, said second black reference signal, and said pixel signal and using both said first black reference signal and said second black reference signal to modify said pixel signal.

2. The method of claim 1 wherein said first black reference signal is captured while said pixel is performing a reset function.

3. The method of claim 1 wherein said first black reference signal, said second black reference signal, and said pixel signal are output through a buffer.

4. The method of claim 1 wherein said first black reference signal is a previous second black reference signal from a previous readout cycle.

5. The method of claim 1 wherein said second black reference signal will be used as a subsequent first black reference signal for a subsequent readout cycle.

6. A column readout circuit for reading out a pixel signal output by a pixel, said circuit comprising:
    a pixel signal branch connected to said pixel, said pixel signal branch including a pixel signal storage element, a pixel signal select switch, and a pixel signal read switch, said pixel signal select switch being connected to said pixel and said pixel signal storage element to selectively store said pixel signal onto said pixel signal storage element, said pixel signal read switch being connected to said pixel signal storage element to selectively read out said pixel signal from said pixel signal storage element;
    a first black reference signal branch connected to said pixel, said first black reference signal branch including a first black reference storage element, a first black reference select switch, and a first black reference read switch, said first black reference select switch being connected to said pixel and said first black reference storage element to selectively store a first black reference signal captured outside of a pixel signal integration period onto said first black reference storage element, said first black reference read switch being connected to said first black reference storage element to selectively read out said first black reference signal from said first black reference storage element; and a second black reference signal branch connected to said pixel, said second black reference signal branch including a second black reference storage element, a second black reference select switch, and a second black reference read switch, said second black reference select switch being connected to said pixel and said second black reference storage element to selectively store a second black reference signal captured outside of said pixel signal integration period onto said second black reference storage element, said second black reference read switch being connected to said second black reference storage element to selectively read out said second black reference signal from said second black reference storage element.

7. The circuit of claim 6 wherein said first black reference signal is stored onto said first black reference storage element prior to the start of said pixel signal integration period.

8. The circuit of claim 6 wherein said second black reference signal is stored onto said second black reference storage element after the completion of said pixel signal integration period.

9. The circuit of claim 6 wherein all of said storage elements are formed from capacitors.

10. The circuit of claim 6 further including a buffer connected to all of said read switches to allow the signals from the storage elements to be read out through said buffer.

* * * * *

UNITED STATES PATENT AND TRADEMARK OFFICE
CERTIFICATE OF CORRECTION

PATENT NO. : 6,982,403 B2
DATED : January 3, 2006
INVENTOR(S) : Hongli Yang et al.

It is certified that error appears in the above-identified patent and that said Letters Patent is hereby corrected as shown below:

<u>Title page,</u>
Item [54], Title, insert -- FOR -- between "APPARATUS" and "KTC".

Signed and Sealed this

Fourteenth Day of March, 2006

JON W. DUDAS
*Director of the United States Patent and Trademark Office*